US007525701B2

(12) United States Patent
Kubo

(10) Patent No.: US 7,525,701 B2
(45) Date of Patent: Apr. 28, 2009

(54) COLOR IMAGE PROCESSING METHOD, COLOR IMAGE PROCESSING APPARATUS, COLOR IMAGE PROCESSING PROGRAM, AND RECORD MEDIUM

(75) Inventor: Masahiko Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1060 days.

(21) Appl. No.: 10/722,452

(22) Filed: Nov. 28, 2003

(65) Prior Publication Data

US 2004/0114166 A1    Jun. 17, 2004

(30) Foreign Application Priority Data

Dec. 12, 2002    (JP)    ............... 2002-360445

(51) Int. Cl.
*H04N 1/46* (2006.01)
*G03F 3/08* (2006.01)

(52) U.S. Cl. ............... 358/515; 358/1.9; 358/500; 358/518; 382/167

(58) Field of Classification Search ............ 382/162, 382/167, 163; 358/1.1, 1.6, 1.9, 448, 443, 358/515, 518, 529, 500, 504
See application file for complete search history.

(56) References Cited

U.S. PATENT DOCUMENTS

| 4,812,899 | A |   | 3/1989  | Kueppers |         |
|-----------|---|---|---------|----------|---------|
| 5,331,440 | A | * | 7/1994  | Kita et al. | 358/529 |
| 5,508,827 | A | * | 4/1996  | Po-Chieh | 358/518 |
| 5,563,724 | A |   | 10/1996 | Boll et al. |       |
| 5,857,063 | A | * | 1/1999  | Poe et al. | 358/1.9 |
| 5,877,797 | A |   | 3/1999  | Miyashita et al. |  |
| 5,878,195 | A | * | 3/1999  | Mahy     | 358/1.9 |
| 5,892,891 | A |   | 4/1999  | Dalal et al. |      |

6,943,915 B1    9/2005  Teraue (Continued)

FOREIGN PATENT DOCUMENTS

JP    A 2-238990    9/1990

(Continued)

OTHER PUBLICATIONS

Konno, Hiroshi et al. "Nonlinear Programming" pp. 284-287.

(Continued)

*Primary Examiner*—King Y Poon
*Assistant Examiner*—Lawrence E Wills
(74) *Attorney, Agent, or Firm*—Oliff & Berridge, PLC

(57) ABSTRACT

A black amount/solid color amount determination section determines a black amount K and a solid color amount O from an input L*a*b* color signal and transfers K and O to a YMC determination section and an image record signal output section. The YMC determination section determines YMC color signal of an image output unit colorimetrically matching the L*a*b* color signal input under a condition that the black amount is K color signal and the solid color amount is O color signal from the input L*a*b* color signal and the KO color signal input from the black amount/solid color amount determination section, and transfers the YMC color signal to the image record signal output section. The image record signal output section outputs the KO color signal input from the black amount/solid color amount determination section and the YMC color signal input from the YMC determination section.

19 Claims, 7 Drawing Sheets

U.S. PATENT DOCUMENTS

2003/0169438 A1 * 9/2003 Velde et al. .................. 358/1.9

FOREIGN PATENT DOCUMENTS

| JP | A 8-242386 | 9/1996 |
| JP | A 11-69176 | 3/1999 |
| JP | 2000-32284 | 1/2000 |
| JP | 2001-136401 | 4/2001 |
| JP | A 2001-157074 | 6/2001 |

OTHER PUBLICATIONS

Murai, Kazumasa et al. "An Accurate Color Transformation Algorithm Based on Flexible GCR-(2) Accurate Printer Model By Neural Network." *Japan Hard Copy 1994 Collected Papers* pp. 181-184.

* cited by examiner

FIG. 3

| K | O | ΔE*ab | IN COLOR GAMUT |
|---|---|---|---|
| 0 | 0 | 0 | O |
| 0 | 25 | 0 | O |
| 0 | 50 | 0 | O |
| 0 | 75 | 0 | O |
| 0 | 100 | 2 | X |
| 25 | 0 | 0 | O |
| 25 | 25 | 0 | O |
| 25 | 50 | 0 | O |
| 25 | 75 | 2 | X |
| 25 | 100 | 4 | X |
| 50 | 0 | 0 | O |
| 50 | 25 | 0 | O |
| 50 | 50 | 2 | X |
| 50 | 75 | 4 | X |
| 50 | 100 | 6 | X |
| 75 | 0 | 0 | O |
| 75 | 25 | 2 | X |
| 75 | 50 | 4 | X |
| 75 | 75 | 6 | X |
| 75 | 100 | 8 | X |
| 100 | 0 | 2 | X |
| 100 | 25 | 4 | X |
| 100 | 50 | 6 | X |
| 100 | 75 | 8 | X |
| 100 | 100 | 10 | X |

COLOR IMAGE PROCESSING METHOD, COLOR IMAGE PROCESSING APPARATUS, COLOR IMAGE PROCESSING PROGRAM, AND RECORD MEDIUM

The present disclosure relates to the subject matter contained in Japanese Patent Application No. 2002-360445 filed on Dec. 12, 2002, which is incorporated herein by reference in its entirety.

BACKGROUND OF THE INVENTION

1. Field of the Invention

This invention relates to a color image processing technique for converting an input color image signal into a color image record signal of a color printer, etc., and more particularly to a technique for converting an input color image signal into a color image record signal of N or more colors including a solid color (N is an integer of five or more).

2. Description of the Related Art

In a print technique, solid colors provided by primary color ink of red (R), green (G), and blue (B) and fluorescent ink are added to four colors of Y (yellow), M (magenta), C (cyan), and K (black) to perform color reproduction as a technique for representing vivid colors that cannot be reproduced in four-color process print of Y, M, C, and K. As color samples of solid colors, color samples of Pantone and the like are known and about 1000 solid colors are defined.

However, up to a maximum of eight colors can be printed at the same time on a printer and thus the number of solid colors that can be used is four at the maximum and is a very small number; there is designer's demand for increasing the number of solid colors that can be used. Further, to prepare solid color ink, basic inks of about 20 colors need to be mixed in accordance with the mixing ratio defined in the color sample. When solid color ink is replaced, ink mixing work, printer cleaning work, and the like are required and thus solid color print involves a large number of steps at the print site; this is a problem.

To solve such a problem, in print technique, a color reproduction method called HiFi color print is proposed for the purpose of enlarging color gamut by perform color reproduction using five to seven colors in which at least one color of RGB is added to four process colors of YMCK, and making it possible to reproduce solid color colorimetrically by performing color separation processing. As HiFi color print, hexachrome print of Pantone is widely used; it is known that about 90% of solid color can be reproduced by performing color reproduction in six colors of four colors of YMCK plus R-based orange (O) ink and G ink. The color reproduction method of the HiFi color print, which will be hereinafter referred to as HiFi color, is general as a technique of enlarging the color gamut since the application range of HiFi color is also widened to ink jet and electrophotographic color printers.

Further, in print and a color printer, a color signal of a display or a digital camera of sRGB color space, etc., may be input as an input signal. Since the color gamut of YMCK four-color process print or a color printer is narrower than the color gamut of the sRGB color space, there is demand for enlarging the color gamut intended for faithful reproduction. Also in such a case, enlarging the color gamut using the HiFi color is effective.

Thus, in the HiFi color, it is possible to enlarge the color gamut of a color printer. At this time, to well reproduce a calorimetric value signal of input solid color and an sRGB color signal, it is necessary to match the tristimulus values of print of output matter with the tristimulus values of the input color signal, namely, realize colorimetric color reproduction in color conversion processing of converting the input color signal into a an image record signal of five to seven colors.

A color management system (CMS) based on the specifications proposed by International Color Consortium (ICC) widely prevalent as industrial standard at present converts an RGB color signal of an input color signal of machine-dependent color space into a device-independent color signal like L*a*b* or XYZ color space and then converts the device-independent color signal into a YMCK color signal of a color printer of machine-dependent color space. As such conversion processing is performed, the input color signal and the output image record signal match in device-independent color signal and thus it is possible to ensure colorimetric color reproduction. As the CMS, ColorSync installed in the Mac (registered trademark) operating system of Apple and ICM installed in Windows (registered trademark) of Microsoft are representative.

It is also considered in the HiFi color that a CMS in conformity with ICC is adopted for realizing colorimetric color reproduction. To do this, color conversion from a device-independent color signal like L*a*b* or XYZ color space to an image record signal of five to seven colors maybe realized. The following technique is proposed as a related art of color conversion processing for the HiFi color:

U.S. Pat. No. 4,812,899 discloses an image formation apparatus for performing color reproduction in process inks of seven colors of YMCKRGB. In the image formation apparatus, color conversion from an RGB signal of an input machine such as a scanner to YMCKRGB of an output machine such as a printer is determined by UCR (Under Color Removal) of achromatic component and chromatic component, and a technique called Kueppers Technique is proposed. This technique is the first proposed technique as color conversion processing of the HiFi color and has an easy algorithm and thus is widely utilized.

Considering application of Kueppers Technique to color conversion in conformity with ICC, it is possible to adopt a method of converting a device-independent color signal like L*a*b* color space into an RGB color signal by any color conversion unit and performing UCR processing of achromatic component and chromatic component for the RGB signal. However, as with the usual UCR processing, a colorimetric match between the RGB color signal of an input color signal and the YMCKRGB color signal of an image record signal is not considered and therefore the technique cannot realize calorimetric color reproduction and color conversion accuracy is poor; this is a problem. Further, as with the usual UCR processing, the technique involves a problem of incapability of making full use of the color gamut of an output machine and a problem of incapability of making full use of the color gamut widened in the HiFi color.

In contrast, the following technique called a division method is proposed: The color gamut of the HiFi color consisting of five to seven colors is divided into color gamut divisions each involving three or four colors in combination, and color conversion from the colorimetric value is performed in each color gamut division according to a similar technique to that with a usual three-color or four-color printer. For example, JP-A-2000-32284 proposes a technique of using color gamut divisions each involving K and other two colors close to K in hue in combination and determining coefficients in a direct look-up table (DLUT) for color conversion processing for realizing colorimetric color reproduction. For example, JP-A-2001-136401 proposes a technique of using color gamut divisions each involving K and other three colors in combination and determining DLUT coefficients for color conversion processing for realizing colorimetric color reproduction. Further, for example, U.S. Pat. No. 5,563,724 proposes a method of forming k (k<n) color gamut divisions each consisting of m color inks in an image formation apparatus of n (n>4) color inks and creating a printer model for each color gamut division, thereby converting from CIE color space into n-color inks color space so that a calorimetric match is found in the color gamut division and the color difference becomes the minimum outside the color gamut division. Further, for example, U.S. Pat. No. 5,892,891 describes a color conversion method from the colorimetric value in five-colors process of YMCKO; it proposes a method of executing color conversion of the colors in the YMCK color gamut from a colorimetric value. A color in the YMCK color gamut is converted from L*a*b* color space to YMCK. A color outside the YMCK color gamut is color-converted using a color gamut division to which a solid color is added (YOMK color gamut).

Each of the division methods disclosed in the documents has the advantage that the color conversion accuracy is high because colorimetric color reproduction in each color gamut division is insured. Although the computation amount is large as compared with Kueppers Technique, the division method is rarely used directly to perform color conversion; usually, it is used only for determining the lattice point parameter of DLUT for executing color conversion from L*a*b* color space to color signal of five to seven colors of an output machine, and therefore the large computation amount does not introduce any problem.

Thus, the division method has the advantage that the color conversion accuracy is high because colorimetric color reproduction is insured. However, the division method involves an intrinsic problem such that the color separation values become discontinuous on the boundary between the color gamut divisions and a pseudo contour occurs, as described in JP-A-2001-136401. Then, in the method disclosed in JP-A-2001-136401, occurrence of pseudo contours is suppressed by performing smoothing processing of the lattice point parameters of DLUT determined by the division method. However, a new problem is caused, that is, the smoothing processing worsens the color conversion accuracy. That is, in the division method, prevention of a pseudo contour and realizing high color conversion accuracy cannot be made compatible; this is a problem of the division method.

Further, a problem occurs in addition to occurrence of the pseudo contour in the boundary depending on the division method into color gamut divisions. In the color gamut division methods disclosed in JP-A-2000-32284 and U.S. Pat. No. 5,563,724, each color gamut division is made up of two or three adjacent colors containing K. In the division methods, the gray axis becomes a single color of K and thus gray cannot be reproduced in three colors of YMC; this is a problem. Usually, gray reproduced in the K single color is poorer in graininess than gray reproduced in the three colors of YMC and therefore a problem of poor graininess in the proximity of the gray axis occurs in the division method. In the division method, the place where the maximum density is generated becomes a K signal color solid part and the maximum density is lower than that in a YMCK four-color solid part in the YMCK four-color process. Full use of the color gamut in the high-density part that should be able to be reproduced essentially cannot be made; this is a problem.

In contrast, in the methods disclosed in JP-A-2001-136401 and U.S. Pat. No. 5,892,891, one of the color gamut divisions is formed of the YMCK color gamut, whereby gray can be reproduced in three colors of YMC and the place where the maximum density is generated can be made a YMCK four-color solid part, so that the graininess in the proximity of the gray axis can be improved and full use of the color gamut of the high-density part can be made. However, in the method, discontinuousness of the color separation values in the boundary between color gamut divisions containing RGB and the YMCK color gamut is very large as compared with that in the division methods disclosed in JP-A-2000-32284 and U.S. Pat. No. 5,563,724. There is a problem of easy occurrence of a pseudo contour.

SUMMARY OF THE INVENTION

It is therefore an object of the invention to provide a color image processing method and apparatus for making it possible not only to insure the colorimetric color reproduction but also to provide smooth gradation representation with no occurrence of any pseudo contour as caused by the division method of the related art for insuring colorimetric color reproduction, as a color conversion processing for HiFi color. In addition, it is another object of the invention to provide a color image processing method and apparatus for making it possible to control the black amount and the solid color amount as desired with considering the image quality of graininess, etc., and further making it possible to make full use of the color gamut in a high-density part.

According to a first aspect of the invention, a color image processing method converts a first color signal including three variables into a second color signal including N variables, where N is an integer, which is not smaller than four. The color image processing method includes a first conversion of determining (N−3) variables of the second color signal from the first color signal, and a second conversion of determining the remaining three variables of the second color signal on the basis of the determined (N−3) variables of the second color signal and the first color signal so that the second color signal is calorimetrically equal to the first color signal. Particularly, the second conversion may include solving a function of the second color signal, which indicates a relation between the second color signal and a device-independent color signal on color system coordinates corresponding to the second color signal, with using the first color signal and the determined (N−3) variables of the second color signal as an input. According to this configuration, colorimetric color reproduction is ensured. Since the function is formed without dividing the color gamut, the color separation results are continuous and smooth gradation representation with no occurrence of any pseudo contour is made possible.

The N variables of the second color signal may include four variables indicating yellow, magenta, cyan, and black, and at least one of three variables indicating red, green, and blue. Accordingly, a color conversion processing of HiFi color can be realized.

The (N−3) variables of the second color signal determined in the first conversion may include a variable indicating black, at least two of four variables indicating red, green, and blue. The three variables determined in the second conversion may include three variables indicating yellow, magenta, and cyan. Accordingly, it is made possible to control the black amount (K) and the solid color amount (RGB) as desired considering the image quality of graininess, etc.

Further, the first conversion may include determining a UCR ratio concerning the (N−3) variables of the second color signal on the basis of the first color signal, determining maximum and minimum values of each of (N−3) variables of the second color signal, which is inputtable in a color gamut, on the basis of the first color signal, and determining the (N−3)

variables of the second color signal to be between the maximum and minimum values on the basis of the UCR ratio concerning the (N−3) variables of the second color signal and the maximum and minimum values. Accordingly, it is made possible to control the black amount and the solid color amount as desired and it is also made possible to make full use of the color gamut.

Further, the first conversion may include determining a UCR ratio concerning an achromatic component, a UCR ratio concerning a chromatic component, and three primary color signals, which represent the first color signal, on the basis of the first color signal, and performing a UCR processing on the basis of the achromatic component and a UCR ration concerning a chromatic ration to eliminate the achromatic component and the chromatic component from the three primary color signals, to thereby determine the (N−3) variables of the second color signal. Accordingly, it is made possible to control the black amount and the solid color amount as desired and it is also made possible to determine the black amount and the solid color amount at high speed by the UCR processing. The three primary color signals may indicate yellow, magenta, and cyan.

The first color signal may be an L*a*b* color signal. Accordingly, calorimetric color reproduction match can be realized.

According to the configuration of the invention, it is made possible to provide the color image processing method and apparatus for making it possible to perform smooth gradation representation with no occurrence of any pseudo contour of a problem in the division method to ensure calorimetric color reproduction in the related art as well as to ensure colorimetric color reproduction required as color conversion processing for HiFi color. In addition, it is made possible to provide the color image processing method and apparatus for making it possible to control the black amount and the solid color amount as desired considering the image quality of graininess, etc., and further making it possible to make full use of the color gamut in a high-density part.

Further, a second color signal is found for each of a plurality of first color signals using the color image processing method as described above, and a color conversion unit for using pairs of the first color signals and the second color signal to convert any first color signal into the second color signal can be provided. Particularly, as the color conversion unit, a direct look-up table of three inputs and N outputs can be used. Accordingly, the color conversion processing can be executed at high speed and in addition, conversion processing with high color conversion accuracy can be realized.

The color image processing method as described above can also be formed as a color image processing program executed by a computer. The color image processing program can also stored on a storage medium.

BRIEF DESCRIPTION OF THE DRAWINGS

FIG. 3 is a schematic representation of an example of a list of the color difference evaluation results used in a black amount/solid color amount determination section.

DETAILED DESCRIPTION OF THE PREFERRED EMBODIMENTS

Figure 1:
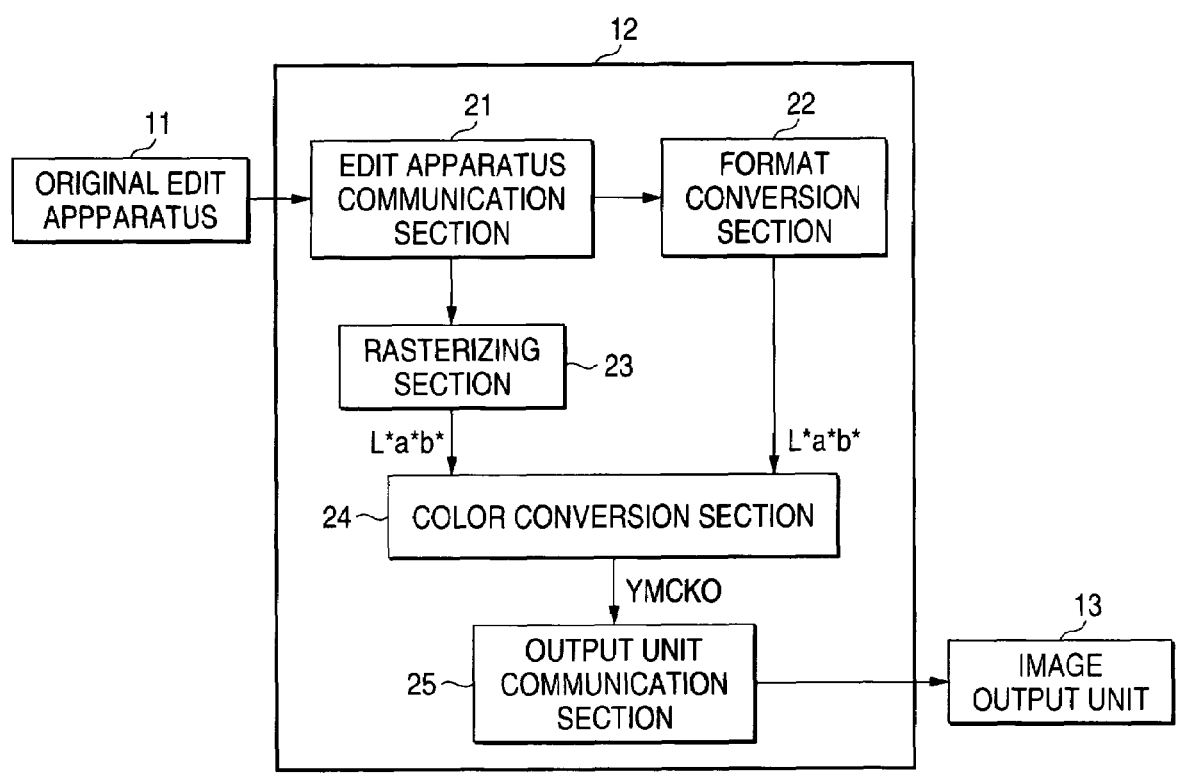
FIG. 1 is a block diagram to show an example of a color DTP system using a color image processing apparatus of the invention.

FIG. 1 is a block diagram to show an example of a color DTP system using a color image processing apparatus according to a first embodiment of the invention. In the figure, numeral 11 denotes an original edit apparatus, numeral 12 denotes an image processing apparatus, numeral 13 denotes an image output unit, numeral 21 denotes an edit apparatus communication section, numeral 22 denotes a format conversion section, numeral 23 denotes a rasterizing section, numeral 24 denotes a color conversion section, and numeral 25 denotes an output unit communication section. To begin with, a color DTP system is taken as an example of a system incorporating the color image processing apparatus according to the first embodiment of the invention, and a configuration example of the color DTP system will be discussed.

The color DTP system shown in FIG. 1 includes the original edit apparatus 11, the image processing apparatus 12, and the image output unit 13. The original edit apparatus 11 is an apparatus for preparing an electronic print original, and outputs electronic original data in a page description language or raster image data to the image processing apparatus 12. Specifically, as the original edit apparatus 11, an original maybe edited using various DTP applications in a general-purpose computer such as a personal computer or may be edited using a dedicated computer.

To use a general-purpose computer, an electronic original is edited using various DTP software products. The prepared electronic original is converted into PostScript (registered trademark) of a page description language by PostScript (registered trademark) printer driver of Adobe, for example, and the conversion result is output to the image processing apparatus 12 through a network such as Ethernet (registered trademark). It is apparent that the page description language to send the electronic original from the DTP personal computer to the image processing apparatus 12 is not limited to PostScript (registered trademark) and maybe any page description language.

To use a dedicated computer, an electronic original can be edited using a dedicated workstation called Color Electric Prepress System (CEPS) and an application. The prepared electronic original is output to the image processing apparatus 12 through a network such as Ethernet (registered trademark) in the raster information format such as TIFF/IT format of standard of raster image data or Scitex format widely prevalent as print electronic data, for example. Of course, it is apparent that the raster information sent from CEPS to the image processing apparatus 12 is not limited to TIFF/IT and any image format may be used if the image data is in the raster format.

As color signal in an electronic original, it is a common practice to assume a printer as an output machine in color DTP and the color of the electronic original is specified using YMCK color signal of yellow, magenta, cyan, and black. In recent years, a print technology using five or more color inks called HiFi color print intended for improving the image quality with enhancement of color reproducibility has been available. In this case, usually an electronic original is represented using color signal of five to seven colors with one to three colors of red, green, and blue added as solid color. For the solid color, the calorimetric value is defined for each color sample in DTP software and the manufacturer of Pantone, etc., and the color sample number are specified on the electronic original, whereby the color is specified with the calorimetric value of L*a*b* color signal, etc. Further, recently, with the widespread use of digital cameras and standardization of color reproduction of RGB color signal such as sRGB color space, it has been also a common practice to specify the color using RGB color signal in color DTP. It is assumed that the color DTP system in the example is that used at the print site, but the invention is not limited to it and the color DTP system may a color DTP system used in an office or a home. For example, in an office, the color space of a display is used as the color signal on an electronic original, and the sRGB color space is generally used.

The image processing apparatus 12 includes the edit apparatus communication section 21, the format conversion section 22, the rasterizing section 23, the color conversion section 24, and the output unit communication section 25. The image processing apparatus 12 converts an electronic original of code information or raster information input from the original edit apparatus 11 into an outputtable format in the image output unit 13 and outputs the conversion result to the image output unit 13.

The electronic original specified in color signal of YMCK, YMCKRGB, RGB, L*a*b*, etc., transmitted from the original edit apparatus 11 is received by the edit apparatus communication section 21 through a network such as a LAN and is transferred to the format conversion section 22 and the rasterizing section 23. The page description language is converted by the rasterizing section 23 into image data in the raster format of an outputtable format in the image output unit 13 and at the same time, the image data undergoes color conversion processing and is converted into L*a*b* color signal of device-independent color space. Image data in the raster format such as TIFF/IT is subjected to resolution conversion and format conversion processing in the format conversion section 22 and is converted into image data in the raster format of an outputtable format in the image output unit 13 and at the same time, the image data undergoes color conversion processing and is converted into L*a*b* color signal of device-independent color space.

The L*a*b* color signal transferred from the rasterizing section 23 and the format conversion section 22 is converted by the color conversion section 24 into an image record signal having variables of five or more colors including yellow, magenta, cyan, black, and one or more solid colors, of color space of the image output unit 13. In the description that follows, orange is assumed as a specific example of the solid color and it is assumed that the color signal is converted into an image record signal of five colors of YMCKO using orange as well as yellow, magenta, cyan, and black. Of course, the solid color to be used is not limited to orange.

The image record signal provided by the color conversion section 24 is transferred to the output unit communication section 25. The output unit communication section 25 stores the image record signal subjected to the processing by the format conversion section 22 to the color conversion section 24 and transfers the image record signal to the image output unit 13 at a appropriate timing, thereby absorbing the processing speed difference between the image processing apparatus 12 and the image output unit 13. In the image output unit 13, an image is formed on paper in accordance with the image record signal in the raster format of five colors of YMCKO.

Color conversion processing from YMCK, YMCKRGB, or RGB color signal into L*a*b* color signal in the rasterizing section 23 and the format conversion section 22 can be realized by CMS in compliance with the known ICC specifications. If the input signal is L*a*b* color signal, the color conversion processing maybe skipped. Further, in the example, the color signal input to the color conversion section 24 is not limited to the L*a*b* color signal. The color conversion section 24 may be configured so that the input signal is in device-independent color space on the color system coordinates of XYZ, etc. It is apparent that even among the RGB color space, which is a device-dependent color space, a color space, for which conversion into the calorimetric value is defined, such as the sRGB color space may be used.

The image output unit 13 may be any if it records an image in the color signal of five or more colors. Any image output unit may be used so long as it is an electrophotographic color printer or an ink jet, thermal transfer, or sliver-salt photo color image output unit, for example.

Figure 2:
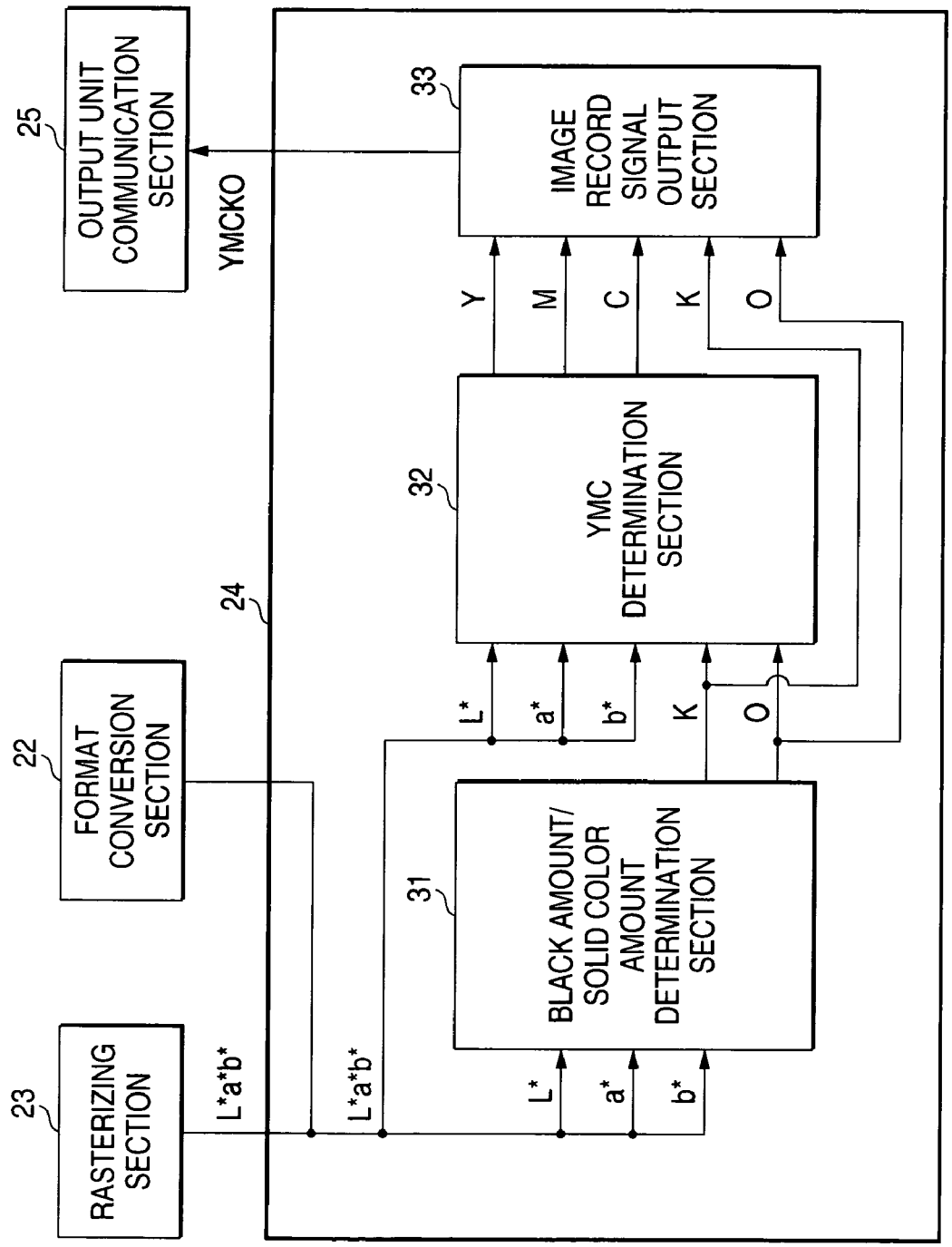
FIG. 2 is a block diagram to show a first embodiment of color conversion section.

Next, the color conversion section 24 of a component for implementing the color image processing apparatus according to the first embodiment of the invention or a color image processing method according to the first embodiment of the invention will be discussed. FIG. 2 is a block diagram to show the color conversion section of the first embodiment. In the figure, numeral 31 denotes a black amount/solid color amount determination section, numeral 32 denotes a YMC determination section, and numeral 33 denotes an image record signal output section. The L*a*b* color signal transferred from the rasterizing section 23 and the format conversion section 22 to the color conversion section 24 is input to the black amount/solid color amount determination section 31 and the YMC determination section 32. The black amount/solid color amount determination section 31 determines black amount K and solid color amount O from the input L*a*b* color signal and transfers K and O to the YMC determination section 32 and the image record signal output section 33. The YMC determination section 32 determines the YMC color signal of the image output unit 13 calorimetrically matching the L*a*b* color signal input under the condition that the black amount is K color signal and the solid color amount is O color signal from the L*a*b* color signal input from the rasterizing section 23 and the format conversion section 22 on the basis of the KO color signal input from the black amount/solid color amount determination section 31, and transfers the YMC color signal to the image record signal output section 33. The image record signal output section 33 transfers the KO color signal input from the black amount/solid color amount determination section 31 and the YMC color signal input from the YMC determination section 32 to the output unit communication section 25. The color conversion processing of the color conversion section 24 is now complete.

The black amount/solid color amount determination section 31 determines the black amount K and the solid color amount O from the input L*a*b* color signal. To do this, the relationship between the image record signal YMCKO of the image output unit 13 and the calorimetric value L*a*b* at that time is previously found as a function, which will be hereinafter referred to as color conversion model. The color conversion model is numerically solved with the L*a*b* color signal obtained from the rasterizing section 23 and the format conversion section 22 and a combination of the black amount K and the solid color amount O as input, thereby calculating the YMC color signal of the remaining three colors of the image output unit 13 colorimetrically matching the L*a*b* color signal. Next, the color difference between a calorimetric value, which is reproduced by a combination of the black amount K and the solid color amount O and the provided YMC color signal, and the input color signal L*a*b* is determined. Thereby, combinations of the black amount K and the solid color amount O for making color reproduction possible in the color gamut of the image output unit 13 and combinations the black amount K and the solid color amount O for making color reproduction impossible are recorded in a list. The minimum value and the maximum value of the black amount that can be input with respect to the input L*a*b* color signal, which will be hereinafter referred to as the minimum black amount and the maximum black amount, are determined from the list. The achromatic UCR ratio to the input L*a*b* color signal is determined based on a predetermined black input function. The black amount K is determined from the maximum black amount, the minimum black amount, and the achromatic UCR ratio. Last, the minimum value and the maximum value of the solid color amount that can be input with respect to the input L*a*b* color signal, which will be hereinafter referred to as the minimum solid color amount and the maximum solid color amount, are determined from the list. The chromatic UCR ratio with respect to the input L*a*b* color signal is determined based on a predetermined solid color input function. The solid color amount O is determined from the maximum solid color amount, the minimum solid color amount, and the chromatic UCR ratio. It is noted that the term "UCR" represents "under control removable".

The YMC determination section 32 numerically solves the above-described color conversion model based on the L*a*b* color signal obtained from the rasterizing section 23 and the format conversion section 22 and the KO color signals obtained from the black amount/solid color amount determination section 31, thereby determining the YMC color signal of the remaining three colors of the image output unit 13, which calorimetrically matching the input L*a*b* color signal and has the black amount of the image output unit 13 being K color signal and the solid color amount being O color signal.

The image record signal output section 33 transfers the image record signal YMCKO to be input to the image output unit 13 to the output unit communication section 25.

Next, the processing of the sections will be discussed specifically. To begin with, the preparation method of the color conversion model of the image output unit 13 will be discussed. The image output unit 13 prints out color patches for any desired combination of image record signal YMCKO of the image output unit 13. The calorimetric values L*a*b* of the color patches are measured using a calorimeter.

For example, as a combination of image record signals YMCKO, a set of 6×6×6×6×6=7,776 patches with dot values of each color in 20% steps is printed out by the image output unit 13, and color measurement is conducted. To do this, for example, X-Rite938 of a calorimeter manufactured by X-Rite can be used as a calorimeter and L*a*b* can be measured under the measurement conditions of D50 and 2-degree field of view. Any number of color patches used for color measurement can be used; however, it is desirable that a large number of patches as much as possible should be used for providing high accuracy of the color conversion model. As a color system used for color measurement, here L*a*b* color system of uniform color space is used, but any other color system such as XYZ color system may be used. However, to evaluate the color difference when the color conversion model is solved, it is preferable that the uniform color space is used.

Next, a neural network is made to learn a plurality of YMCKO and L*a*b* data sets obtained as teacher data. Here, the relationship between YMCKO and L*a*b* can be represented by the following function:

$$(L^*, a^*, b^*) = F(Y, M, C, K, O) \tag{1}$$

Expression (1) is dissolved into color components as follows:

$$L^* = FL(Y, M, C, K, O) \tag{2}$$

$$a^* = Fa(Y, M, C, K, O) \tag{3}$$

$$b^* = Fb(Y, M, C, K, O) \tag{4}$$

The neural network used as the color conversion model may be, for example, a neural network disclosed in a document "An accurate color transformation algorithm based on flexible GCR-(2) accurate printer model by neural network", Kazumasa MURAI et al., Japan Hard Copy '94 Collected Papers, pp. 181-184, and back propagation method can be used for learning. The image record signal in this document is four colors of YMCK. However, the number of cells in the first layer in the neural network is increased from four to five, whereby the image record signal can be used as the color conversion model for HiFi color of five colors. Of course, as the color conversion model, any other polynomial model or a color conversion model in a conversion table form can also be applied in addition to use of the neural network.

Next, the numerical solution method of the color conversion model will be discussed. Here, inverse function of function F cannot uniquely be found. However, if L*a*b* is given and two variables of YMCKO are determined appropriately, the remaining three variables can be found from expression (1). For example, if K and O are given, YMC can be determined. Here, it is assumed that the color to be reproduced is L*a*b* and that the given black amount and solid color amount are K and O. In this case, a color difference $\Delta E^*ab$ between a color to be reproduced and a color reproduced from the image record signal YMC, the black amount K, and the solid color amount O is defined by the following expression as a function of the image record signal YMC:

$$\Delta E^* ab(Y, M, C) = ((L^* - FL(Y, M, C, K, O))^2 + \tag{5}$$
$$(a^* - Fa(Y, M, C, K, O))^2 +$$
$$(b^* - Fb(Y, M, C, K, O))^2)^{1/2}$$

Solving expression (1) of a nonlinear equation is equivalent to finding the value of YMC, which makes the color difference $\Delta E^*ab$ be zero. When $\Delta E^*ab$ is set as an objective function, the problem of finding expression (1) can be interpreted as a nonlinear optimization problem of finding YMC for minimizing the objective function $\Delta E^*ab$. Therefore, expression (1) can be solved according to a nonlinear optimization technique such as a simplex method. As for the simplex method, simplex algorithm is introduced in "Nonlinear Programming" Hiroshi Konno, Nichikagiren shuppansha, pp. 284-287, for example. The simplex method is a technique fitted for optimization of such a multi-variable function, and the optimum value can be found at high speed. Of course, not only the simplex method, but also any nonlinear optimization technique may be applied; any other nonlinear optimization technique such as dichotomy or golden section search may be applied. A numeric solution method of a nonlinear equation such as Newton's method may be applied for solving the color conversion model.

As the color conversion model is thus solved, the YMC color signal of the remaining three colors of the image output unit 13, which colorimetrically matches the input L*a*b* color signal and has the black amount of the image output unit 13 being K color signal and the solid color amount being O color signal, can be determined on the basis of the L*a*b* color signal, the black amount K, and the solid color amount O. Since the above-described color conversion model is formed without dividing the color gamut of the image output unit 13, discontinuousness of the color separation result in the boundary between the color gamut divisions causing a problem in the division method of the related art does not occur on a principle and smooth gradation representation with no pseudo contours is made possible.

Next, the determination method of the black amount K and the solid color amount O in the black amount/solid color amount determination section 31 will be discussed. If L*a*b* is given to expression (1) of the color conversion model and two variables of YMCKO are determined appropriately, the remaining three variables can be found according to the numeric solution method, as described above. That is, if the black amount K and the solid color amount O are determined with respect to the input L*a*b* color signal, the remaining YMC can be determined. Here, the expression (5) of the objective function used for solving expression (1) of the color conversion model represents the color difference between the L*a*b* color signal of the input color signal and the color reproduced from the YMCKO signal determined in the image output unit 13. If the color difference is zero, this represents that the input color signal is in the color gamut of the image output unit 13. If the color difference is greater than zero, this represents that the input color signal is outside the color gamut of the image output unit 13. Therefore, when the color difference of expression (5) of the objective function is determined for a preset combination of the black amount K and the solid color amount O, whether the combination of the black amount K and the solid color amount O makes color reproduction possible or impossible in the color gamut of the image output unit 13 can be determined. In order to determine the black amount K and the solid color amount O while insuring calorimetric color reproduction and making it possible to use the most of the color gamut of the image output unit 13, the range of the black amount K and the solid color amount O for making color reproduction possible in the color gamut may be found and the black amount K and the solid color amount O may be set within the range.

Here, color signal of the image output unit usually is quantized about 256 steps of gradation. Therefore, even if all combinations of the black amount K and the solid color amount O are calculated, the determination method of the range of the black amount K and the solid color amount O for making color reproduction possible in the color gamut considers 256×256=65536 color differences using expression (5). FIG. 3 is a schematic representation of an example of a list of the color difference evaluation results used in the black amount/solid color amount determination section 31. For simplicity, FIG. 3 shows the evaluation results of color difference ΔE*a*b* for all combinations of the black amount K and the solid color amount O when the black amount K and the solid color amount O are 0, 25, 50, 75, 100 with respect to the input L*a*b* color signal. In the list of FIG. 3, when the combination of the black amount K and the solid color amount O is in the color gamut, a circle is entered as the evaluation result; when the combination is outside the color gamut, × is entered.

Next, the range of the black amount K and the solid color amount O for making color reproduction possible in the color gamut is determined from the list of FIG. 3. Here, the order of the colors to be determined needs to be determined. Since the black amount K has a large effect on the image quality, first the black amount K is determined and a case where the combination of the black amount K and the solid color amount O makes color reproduction possible in the color gamut is deemed as the range of the black amount K for making color reproduction possible. Then, it is determined that the minimum black amount in the color gamut (minK) is 0% and that the maximum black amount (maxK) is 75%. Here, assuming that the minimum black amount is not found and is the case where black is not added, minK may be set to 0. Here, setting achromatic UCR ratio=α, the black amount K may be determined between the minimum and maximum black amounts and therefore can be determined according to the following expression:

$$K = \min K + (\max K - \min K) \times \alpha \quad (6)$$

For example, letting the achromatic UCR ratio α be 33.3%, the black amount K in the list of FIG. 3 is determined 25% from expression (6). In addition to the method of thus giving the achromatic UCR ratio α at a fixed rate, the achromatic UCR ratio α may be defined as a function of lightness or chroma saturation because graininess worsens if black is mixed into a high-lightness part or a high-chroma part. That is, the achromatic UCR ratio may be determined according to the black input function with the L*a*b* color signal of an input color signal as input.

For example, when the black amount K is determined 25%, the column with K=25 in the list of FIG. 3 is referenced and a search is made for the minimum and maximum values of the solid color amount with the color difference becoming zero, whereby it is determined that the minimum solid color amount in the color gamut (minO) is 0% and that the maximum solid color amount (maxO) is 50%. Here, assuming that the minimum solid color amount is not found and is the case where no solid color is added, minO may be set to 0. Here, setting chromatic UCR ratio=β, the solid color amount O may be determined between the minimum and maximum solid color amounts and therefore can be determined according to the following expression:

$$O = \min O + (\max O - \min O) \times \beta \quad (7)$$

Here, letting the chromatic UCR ratio β be 100%, the solid color amount O in the list of FIG. 3 is determined 50% from expression (7). In addition to the method of thus giving the chromatic UCR ratio β at a fixed rate, the chromatic UCR ratio β may be defined as a function of lightness or chroma saturation like the achromatic UCR ratio. That is, the chromatic UCR ratio may be determined according to the solid color input function with the L*a*b* color signal of an input color signal as input.

In the example of the list of FIG. 3, the minimum and maximum black amounts and the minimum and maximum solid color amounts can be found, but may be unable to be found because the input color signal L*a*b* is outside the color gamut. In such a case, the combination of the black amount K and the solid color amount O corresponding to the minimum color difference in the list may be determined as the black amount K and the solid color amount O.

In the example, the black amount K is first determined and the solid color amount O is next determined, but the determining order is not limited to this; the solid color amount O may be first determined and the black amount K may be next determined. Of course, this also applies if any other solid color is used.

In the example, the range of the black amount K and the solid color amount O for making color reproduction possible is calculated by evaluating the color difference for all combinations of the black amount K and the solid color amount O. However, the determination method of the range for making color reproduction possible is not limited to this; maxK, minK, maxO, and minO may be found by any other method such as binary search algorithm.

Further, in the description given above, the black amount K and the solid color amount O are first determined and then the remaining YMC color signal to ensure colorimetric color reproduction is determined. However, the color signal to be first determined is not limited to the black amount K or the solid color amount O. To determine the color signal of five colors as described above, two colors may be first determined in such a manner that the Y color signal and the M color signal are first determined and then the black amount K, the solid color amount O, and the C color signal are determined, for example. With regard to the number of color signals passed to the image output unit 13, HiFi color of five colors with four process colors of YMCK to which one solid color, orange, is added is shown as an example. However, the solid color is not limited to orange and the number of solid colors is not limited to one either. Color conversion processing can also be performed by a similar method for six colors with orange and green added to the four colors of YMCK or seven colors with red, green, and blue added to the four colors of YMCK, for example.

The YMC determination section 32 can also numerically solve the color conversion model by the above-described method, thereby determining the YMC color signal of the remaining three colors of the image output unit 13, which calorimetrically matches the input L*a*b* color signal and has the black amount of the image output unit 13 being K and the solid color amount being O, on the basis of the L*a*b* color signal obtained from the rasterizing section 23 and the format conversion section 22 and the black amount K and the solid color amount O obtained from the black amount/solid color amount determination section 31. Since the YMCKO color signal is thus determined, it is possible to ensure colorimetric color reproduction. Since the used color conversion model is formed without dividing the color gamut of the image output unit 13, a pseudo contour of the problem in the division method of the related art does not occur.

Thus, the black amount K and the solid color amount O of the image output unit 13 are determined from the L*a*b* color signal of an input color signal on the basis of the range of the black amount K and the solid color amount O for making color reproduction possible in the color gamut found by solving the color conversion model of the image output unit 13 using the numerical solution method and the achromatic UCR ratio and the chromatic UCR ratio determined from the L*a*b* color signal. Accordingly, the black amount and the solid color amount can be controlled as desired with respect to the L*a*b* color signal of the input color signal considering the image quality of graininess, etc., and it is made possible to make full use of the color gamut of the image output unit. Further, as described above, the remaining three-variable color signal YMC of the image output unit 13 is determined from the black amount K, the solid color amount O, and the input color signal L*a*b* by solving the color conversion model of the image output unit 13 using the numerical solution method so that the YMC color signal becomes colorimetrically equal to L*a*b* of device-independent color signal, whereby it is made possible to ensure calorimetric color reproduction. Particularly, occurrence of a pseudo contour is a problem in the division method to ensure colorimetric color reproduction in the related art; in the invention, however, since the color conversion model of the image output unit 13 is formed without dividing the color gamut, smooth gradation representation with no occurrence of any pseudo contour is made possible.

Figure 4:
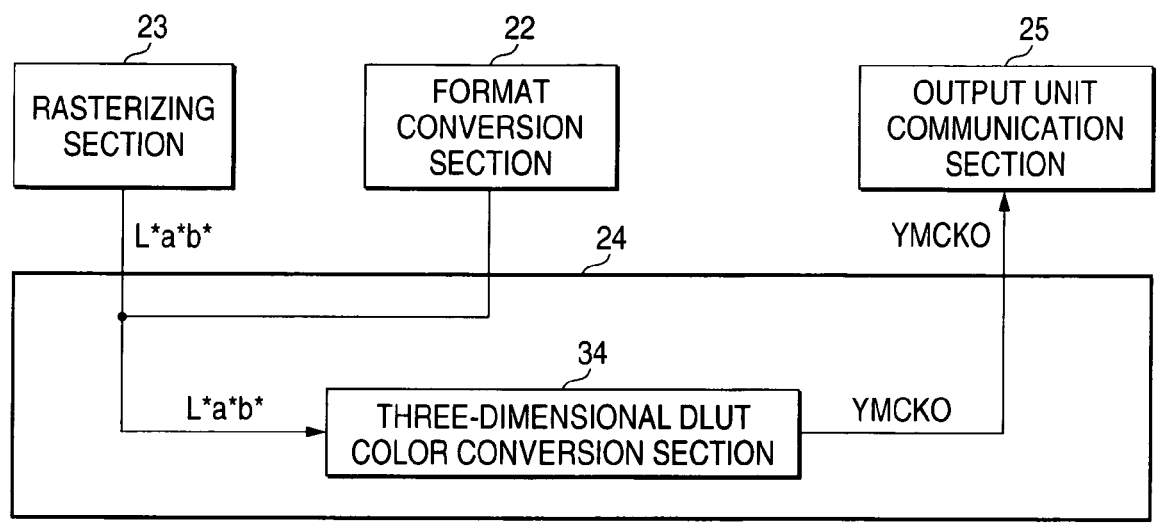
FIG. 4 is a block diagram to show a second embodiment of color conversion section.

FIG. 4 is a block diagram to show a color conversion section according to a second embodiment. In the figure, numeral 34 denotes a three-dimensional DLUT color conversion section. In color conversion section 24 of the second embodiment, the color conversion section 24 is implemented as the three-dimensional DLUT color conversion section 34 having three inputs and five outputs.

The three-dimensional DLUT color conversion section 34 is implemented as a three-dimensional direct look-up table (DLUT) for inputting L*a*b* color signal and outputting YMCKO color signal corresponding to the L*a*b* color signal. For example, it is a three-dimensional DLUT for using the value resulting from dividing each axis of the input L*a*b* color signal by 16 as input address, performing interpolation operation by cubic interpolation, and calculating image record signal YMCKO of the image output unit 13. Of course, the interpolation is not limited to the cubic interpolation and any other interpolation such as triquetrous interpolation or tetrahedral interpolation may be applied if it is known interpolation. It is also apparent that the number of divisions of each axis of the input signal is not limited to 16.

Here, the color conversion section 24 is implemented as the three-dimensional direct look-up table, but is not limited to this example so long as three-input, five-output color conversion can be executed; any other color conversion technique maybe applied so long as it is a known color conversion technique of a neural network, etc. Further, the color signal input to the color conversion section 24 is not limited to the L*a*b* color signal and maybe formed so as to be come device-independent color space on color system coordinates of XYZ, etc. Even among the RGB color space, which is a device-dependent color space, a color space, for which conversion into the colorimetric value is defined, such as the sRGB color space may be used as the input color signal of the color conversion section 24.

Figure 5:
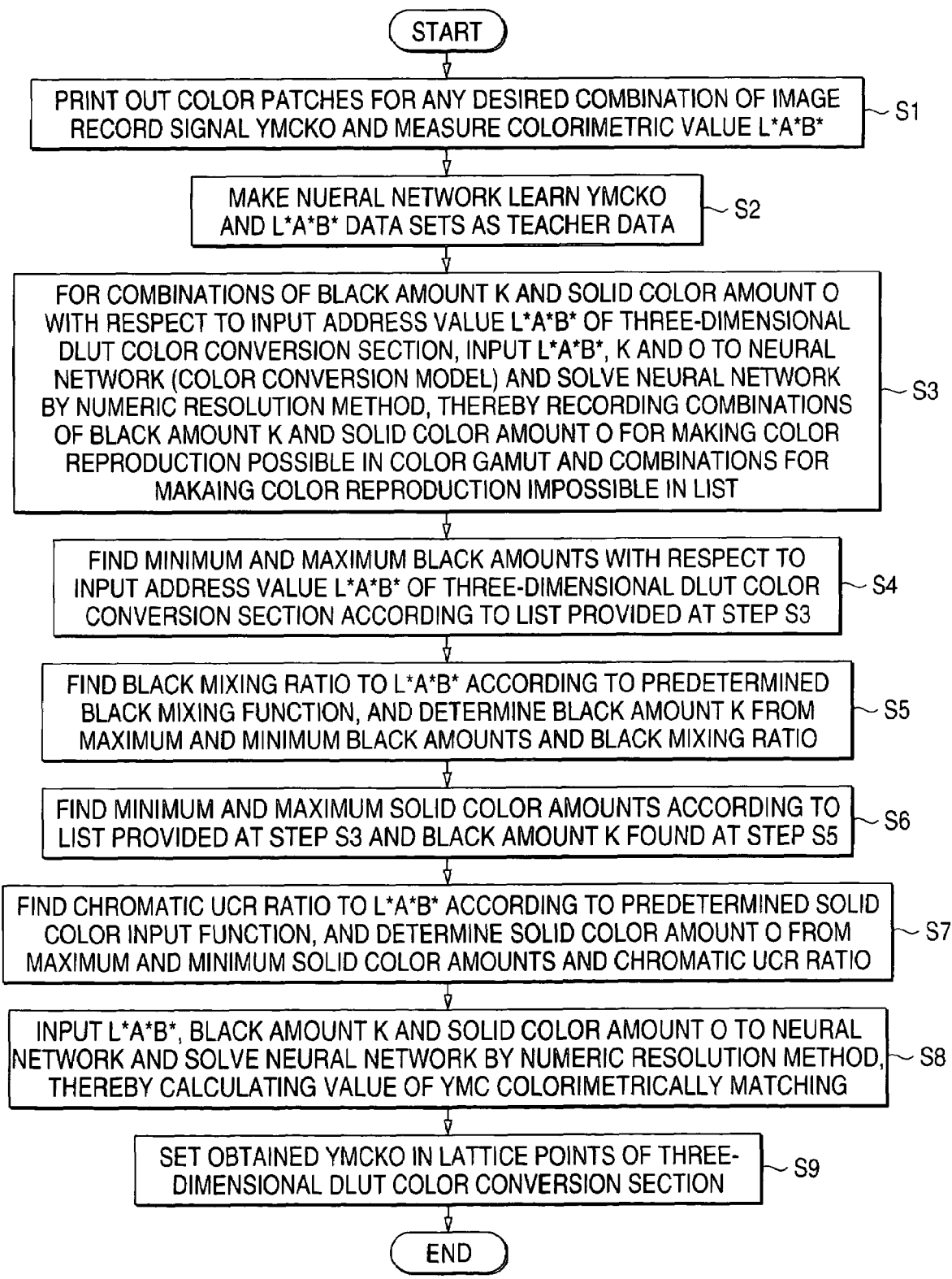
FIG. 5 is a flow chart to show an example of color conversion parameter determination processing of a three-dimensional DLUT color conversion section 34 in the second embodiment of color conversion section.

FIG. 5 is a flowchart to show an example of color conversion parameter determination processing of the three-dimensional DLUT color conversion section 34 in the color conversion section of the second embodiment. This processing is almost similar to the processing of the color conversion section 24 of the first embodiment.

To begin with, at step S1, the image output unit 13 prints out color patches for any desired combination of image record signal YMCKO of the image output unit 13. Then, the colorimetric value L*a*b* at this time is measured using a calorimeter. The combination of the image record signal YMCKO and the color measurement conditions may be similar to those in the first embodiment described above.

At step S2, a neural network of color conversion model is made to learn a plurality of YMCKO and L*a*b* data sets obtained at step S1 as teacher data. The neural network may be similar to that used in the first embodiment described above.

At step S3, for combinations of the black amount K and the solid color amount O with respect to the input address value L*a*b* of the three-dimensional DLUT color conversion section 34, L*a*b*, K, and O are input to the neural network (color conversion model) and the neural network is solved by a numeric resolution method, whereby the combinations of the black amount K and the solid color amount O for making color reproduction possible in the color gamut and the combinations of the black amount K and the solid color amount O for making color reproduction impossible are recorded in a list. The numerical solution method of the neural network of the color conversion model, the calculation method of the list for determining the range of the black amount K and the solid color amount O, and the like may be similar to those in the first embodiment described above.

At step S4, the minimum and maximum black amounts with respect to the input address value L*a*b* of the three-dimensional DLUT color conversion section 34 are found according to the list provided at step S3. The determination method of the minimum and maximum black amounts may also be similar to that in the first embodiment described above.

At step S5, the achromatic UCR ratio to L*a*b* is found according to a predetermined black input function, and the black amount K is determined from the maximum and minimum black amounts and the achromatic UCR ratio. The black amount K can be determined, for example, using a similar method to that in the first embodiment using expression (6) shown in the first embodiment described above.

At step S6, the minimum and maximum solid color amounts are found according to the list provided at step S3 and the black amount K found at step S5. The determination method of the minimum and maximum solid color amounts may also be similar to that in the first embodiment described above.

At step S7, the chromatic UCR ratio to L*a*b* is found according to a predetermined solid color input function, and the solid color amount O is determined from the maximum and minimum solid color amounts and the chromatic UCR ratio. The solid color amount O can be determined, for example, using a similar method to that in the first embodiment using expression (7) shown in the first embodiment described above.

At step S8, L*a*b*, the black amount K, and the solid color amount O are input to the neural network and the neural network is solved by a numeric resolution method, whereby the value of YMC calorimetrically matching is calculated. The numerical solution method of the neural network may be similar to that in the first embodiment described above.

Last, at step S9, the image record signal YMC obtained at step S8, the black amount K obtained at step S5, and the solid color amount O obtained at step S7 are set in the lattice points of the three-dimensional DLUT color conversion section 34, whereby the color conversion parameter of the three-dimensional DLUT color conversion section 34 can be determined.

The color conversion parameter of the three-dimensional DLUT color conversion section 34 is thus previously determined. For example, the values of YMCKO at the lattice points provided by dividing each axis of the input L*a*b* color signal by 16 are set in the three-dimensional DLUT color conversion section 34. The actually input L*a*b* color signal is not limited to the lattice point and any desired L*a*b* color signal is input. Therefore, to perform color conversion processing, one or more lattice point addresses are generated based on the input L*a*b* color signal, the value of YMCKO is read, and interpolation processing is performed, whereby the YMCKO color signal corresponding to the input L*a*b* color signal is obtained.

Thus, in the second embodiment, direct color conversion is executed with the previously prepared direct look-up table without performing processing involving a large amount of computation to perform color conversion processing in the color conversion section 24 as in the configuration shown in the first embodiment described above, so that it is made possible to accomplish color conversion at very high speed. If a hardware configuration is adopted, the configuration can be made simple because the computation amount is small.

Next, a third embodiment of color conversion section 24 will be discussed. In the third embodiment, color signal (black amount and solid color amount) of (N−3) variables of N variables is determined according to a different configuration from that in the first embodiment described above. In the third embodiment, as an image record signal of the image output unit 13, an image is output by HiFi color including seven colors of four process colors of YMCK and three colors of red R, green G, and blue B. Of course, in the third embodiment, the solid colors added to the four process colors of YMCK are not limited to RGB.

Figure 6:
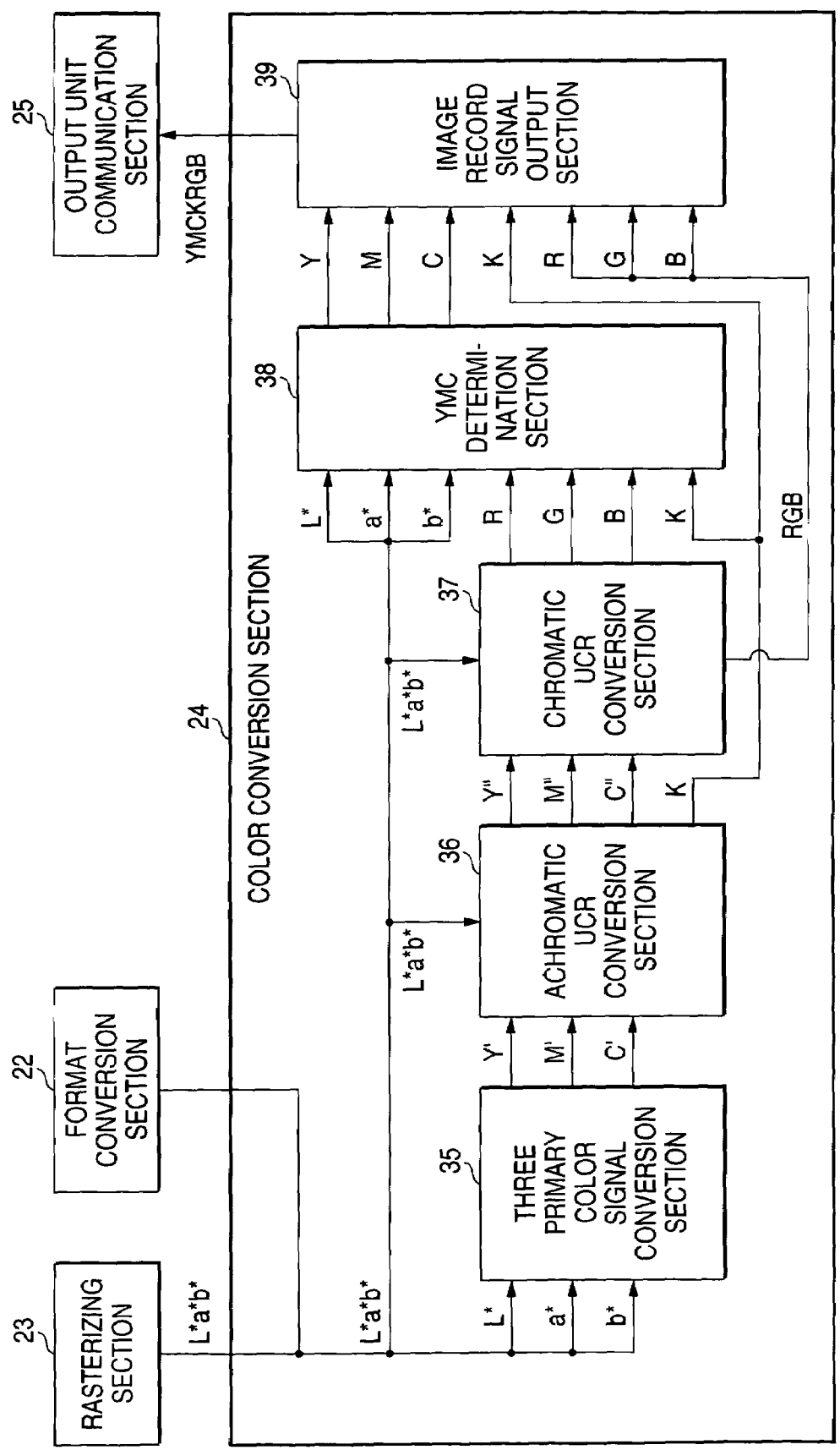
FIG. 6 is a block diagram to show a third embodiment of color conversion section.

FIG. 6 is a block diagram to show a color conversion section of the third embodiment. In the figure, numeral 35 denotes a three primary color signal conversion section, numeral 36 denotes an achromatic UCR conversion section, numeral 37 denotes a chromatic UCR conversion section, numeral 38 denotes a YMC determination section, and numeral 39 denotes an image record signal output section. As shown in FIG. 6, in the color conversion section 24 of the third embodiment, the three primary color signal conversion section 35, the achromatic UCR conversion section 36, and the chromatic UCR conversion section 37 are provided as components for determining the black amount and the solid color amount. The YMC determination section 38 for determining the remaining YMC color signal from the black amount K, the solid color amount RGB, and input color signal L*a*b* and the image record signal output section 39 for transferring an image record signal YMCKRGB to the output unit communication section 25 have the same functions as the YMC determination section 32 and the image record signal output section 33 in the first embodiment described above although they differ in the number of solid colors.

The L*a*b* color signal transferred from the rasterizing section 23 and the format conversion section 22 to the color conversion section 24 is input to the three primary color signal conversion section 35, the achromatic UCR conversion section 36, the chromatic UCR conversion section 37, and the YMC determination section 38. The three primary color signal conversion section 35 converts the input L*a*b* color signal into Y'M'C' color signals, which are three primary colors of complementary colors and transfers the Y'M'C' color signals to the achromatic UCR conversion section 36.

The achromatic UCR conversion section 36 determines a UCR ratio concerning the achromatic component according to a predetermined black input function from the L*a*b* color signal input from the rasterizing section 23 and the format conversion section 22, and determines the black amount K and Y"M"C" color signal by performing UCR processing from the Y'M'C' color signal input from the three primary color signal conversion section 35. Then, the achromatic UCR conversion section 36 transfers the determined Y"M"C" color signal to the chromatic UCR conversion section 37 and the determined black amount K to the YMC determination section 38 and the image record signal output section 39.

The chromatic UCR conversion section 37 determines a UCR ratio concerning the chromatic component according to a predetermined solid color input function from the L*a*b* color signal input from the rasterizing section 23 and the format conversion section 22. Then, the chromatic UCR conversion section 37 determines the solid color amount RGB by performing UCR processing using the determined UCR ratio from the Y"M"C" color signal input from the achromatic UCR conversion section 36 and transfers the determined solid color amount RGB to the YMC determination section 38 and the image record signal output section 39.

The YMC determination section 38 receives the L*a*b* color signal from the rasterizing section 23 and the format conversion section 22, the black amount K from the achromatic UCR conversion section 36, and the solid color amount RGB from the chromatic UCR conversion section 37. Then, the YMC determination section 38 determines the YMC color signal, which is the remaining three variable color signals of the image record signal, colorimetrically matching the L*a*b* color signal of the input color signal on the basis of the received L*a*b* color signal, black amount K, and solid color amount RGB, and transfers the determined YMC color signal to the image record signal output section 39.

The image record signal output section 39 transfers the black amount K input from the achromatic UCR conversion section 36, the solid color amount RGB input from the chromatic UCR conversion section 37, and the YMC color signal input from the YMC determination section 38 to the output unit communication section 25.

The color signal input to the color conversion section 24 is not limited to the L*a*b* color signal and may be device-independent color space on color system coordinates of XYZ, etc. Even among the RGB color space, which is a device-dependent color space, a color space, for which conversion into the calorimetric value is defined, such as the sRGB color space may be used.

The processing of the sections will be discussed in more detail. The three primary color signal conversion section 35 converts the L*a*b* color signal obtained from the rasterizing section 23 and the format conversion section 22 into Y'M'C' color signals, which are three primary colors of complementary colors. As three-input, three-output color conversion from the colorimetric value into the three primary colors, a known color conversion processing method typified by CMS based on the specifications proposed by ICC can be used. For example, conversion from the L*a*b* color signal into the Y'M'C' color signal can be executed according to a three-dimensional direct look-up table.

In the example, the YMC color space of the image output unit 13 is used as the color space of the Y'M'C' color signal output from the three primary color signal conversion section 35. However, any other YMC color space maybe used considering the color conversion accuracy, full use of the color gamut, etc. Further, conversion into the RGB color space of three primary colors of primary color systems rather than conversion into the YMC color space of three primary colors of complementary color systems may be performed.

The achromatic UCR conversion section 36 determines the UCR ratio concerning the achromatic component according to the predetermined black input function from the L*a*b* color signal input from the rasterizing section 23 and the format conversion section 22, as described above. Then, the achromatic UCR conversion section 36 converts the Y'M'C' color signal obtained from the three primary color signal conversion section 35 into the black amount K and Y"M"C" color signal by performing UCR processing using the determined UCR ratio. The UCR processing can be implemented by a known method. For example, the UCR processing concerning the achromatic component can be implemented by operations performed based on the following expressions (8) to (12):

$$Kacro = \min(Y', M', C') \tag{8}$$

$$K = UCRacro(L^*, a^*, b^*) \times Kacro \tag{9}$$

$$Y'' = Y' - Kacro \tag{10}$$

$$M'' = M' - Kacro \tag{11}$$

$$C'' = C' - Kacro \tag{12}$$

Kacro denotes the minimum value of the Y'M'C' color signal and represents the achromatic component of the Y'M'C' color signal. UCRacro (L*,a*,b*) is a UCR function of the achromatic component and is a function of defining the UCR ratio of the achromatic component to the input L*a*b* color signal. For example, to improve graininess by not mixing a black into a high-lightness part, it is advisable to set the UCR function of the achromatic component so that if L* is 100 to 50, the UCR ratio is set to zero and that if L* is 50 to 0, the UCR ratio changes linearly from 0% to 100%. The UCR ratio of the achromatic component may also be fixed.

The black amount K can be determined by multiplying the achromatic component Kacro by the UCR ratio of the achromatic component as shown in expression (9). The Y"M"C" color signal can be calculated by subtracting the achromatic component Kacro from the Y'M'C' color signal as shown in expressions (10) to (12).

The chromatic UCR conversion section 37 converts the Y"M"CC" color signal obtained from the achromatic UCR conversion section 36 into the solid color amount RGB by performing UCR processing concerning the chromatic component. The UCR processing can be implemented by a known method. For example, the UCR processing can be implemented by operations performed based on the following expressions (13) and (14):

$$Scro = \min(C1, C2) \tag{13}$$

$$S = UCRcro(L^*, a^*, b^*) \times Scro \tag{14}$$

One color of the Y"M"C" color signal becomes zero due to the URC processing of the achromatic component performed by the achromatic UCR conversion section 36, and C1 and C2 represent the color signals of two colors of the Y"M"C" color signal, which are not zero. Scro represents the chromatic component of the Y'M'C' color signal. UCRcro (L*,a*,b*) is a UCR function of the chromatic component and is a function of defining the UCR ratio of the chromatic component to the input L*a*b* color signal. Here, the UCR ratio of the chromatic component is fixed to 100%. Of course, the UCR ratio of the chromatic component may be fixed to any percentage other than 100% or to enhance the UCR ratio in a high-chroma part, the UCR function may be used to set the UCR ratio of the chromatic component.

The solid color amount S is determined by multiplying the chromatic component Scro by the UCR ratio, as shown in expression (14). The solid color amount S becomes the color signal corresponding to R when C1 and C2 indicate Y"M"; the color signal corresponding to B when C1 and C2 indicate M"C"; the color signal corresponding to G when C1 and C2 indicate Y"C"; and the color signals of other two colors become zero.

Thus, in the third embodiment, the black amount and the solid color amount are determined by performing UCR processing, whereby the black amount and the solid color amount can be controlled as desired with respect to the input L*a*b* color signal considering the image quality of graininess, etc. In addition, the black amount and the solid color amount can be determined at extremely high speed as compared with the method shown as the first embodiment. However, in the first embodiment, full use of the color gamut of the image output unit 13 can be made because the black amount and the solid color amount can be determined in the range of the black amount and the solid color amount for making color reproduction possible in the color gamut; whereas, in the third embodiment, the range of the black amount and the solid color amount for making color reproduction possible in the color gamut is not achieved. Therefore, it is expected that the black amount and the solid color amount maybe too large or too small depending on the input color signal. When the black amount and the solid color amount are be too large or too small, the input color signal that can be essentially reproduced in the color gamut may not be reproduced and that full use of the color gamut of the image output unit 13 may not be made. Therefore, to give a high priority to the processing speed even if the full use of the color gamut is a little sacrificed, it is desirable that the configuration shown as the third embodiment should be used. To give a high priority to the full use of the color gamut rather than the processing speed, it is desirable that the configuration shown as the first embodiment should be used.

The YMC determination section 38 numerically solves the color conversion model of the image output unit 13 from the L*a*b* color signal received from the rasterizing section 23 and the format conversion section 22, the black amount K received from the achromatic UCR conversion section 36, and the solid color amount RGB received from the chromatic UCR conversion section 37, thereby determining the YMC color signal of the remaining three colors of the image output unit 13, which colorimetrically match the input L*a*b* color signal and have the black amount of the image output unit 13 being K and the solid color amount being RGB.

As for the color conversion model of the image output unit 13 and the numerical solution method, similar techniques to those in the first embodiment described above can be used. To prepare the color conversion model of the image output unit 13, the image output unit 13 prints out color patches for any desired combination of image record signal YMCKRGB of the image output unit 13. The colorimetric value L*a*b* at this time is measured using a colorimeter. As a combination of image record signal YMCKRGB, for example, a set of 4×4×4×4×4×4×4=16,384 patches with dot values of each color in 33.3% steps can be used. The image output unit 13 prints out Such a patch set, and L*a*b* may be measured under similar color measurement conditions to those in the first embodiment.

A neural network is made to learn a plurality of YMCK-RGB and L*a*b* data sets thus obtained as teacher data. Here, the relationship between YMCKRGB and L*a*b* can be represented by the function shown in the following expression (15) as with the first embodiment:

$$(L^*,a^*,b^*)=F(Y,M,C,K,R,G,B) \quad (15)$$

Expression (15) is dissolved into color components as follows:

$$L^*=FL(Y,M,C,K,R,G,B) \quad (16)$$

$$a^*=Fa(Y,M,C,K,R,G,B) \quad (17)$$

$$b^*=Fb(Y,M,C,K,R,G,B) \quad (18)$$

In the document shown in the first embodiment, the number of cells in the first layer in the neural network is increased from four to seven, whereby the image record signal can be used as the color conversion model for HiFi color of seven colors. Of course, as the color conversion model, any other polynomial model or a color conversion model in a conversion table form can also be applied in addition to use of the neural network.

The numerical solution method of the color conversion model can also be realized by a nonlinear optimization technique using color difference ΔE*ab between the color to be reproduced, L*a*b*, and the color when the image record signal YMC, the black amount K, and the solid color amount RGB are applied as objective function as with the first embodiment. As the nonlinear optimization technique, for example, a simplex method can be used as in the first embodiment. At this time, the objective function is given by the following expression:

$$\Delta E^*ab(Y,M,C) = ((L^* - FL(Y,M,C,K,R,G,B))^2 + \quad (19)$$
$$(a^* - Fa(Y,M,C,K,R,G,B))^2 +$$
$$(b^* - Fb(Y,M,C,K,R,G,B))^2)^{1/2}$$

Since the color conversion model of the image output unit 13 is thus numerically solved, the YMC color signal of the remaining three colors of the image output unit 13 colorimetrically, which match the input L*a*b* color signal and have the black amount of the image output unit 13 being K and the solid color amount being RGB, can be determined from the L*a*b* color signal, the black amount K, and the solid color amount RGB. Accordingly, it is made possible to ensure colorimetric color reproduction. Since the color conversion model according to the embodiments of the invention is formed without dividing the color gamut of the image output unit 13, a pseudo contour of a problem in the division method of the related art does not occur.

Last, the image record signal output section 39 transfers the image record signal YMCKRGB to the output unit communication section 25. The color conversion processing of the color conversion section 24 is now complete.

In the description of the third embodiment, as the number of color signals of the image output unit 13, HiFi color of seven colors with four process colors of YMCK to which three solid colors RGB are added is shown. However, the colors used as the solid colors and the number of the solid colors are not limited to them. Color conversion processing can also be performed by a similar method for six colors with orange and green added to the four colors of YMCK or five colors with orange added to the four colors of YMCK, for example.

The color conversion parameter of a three-dimensional direct look-up table with three inputs and seven outputs as with the second embodiment may be determined in accordance with the method described in the third embodiment to perform color conversion processing. Accordingly, high-speed color conversion processing can be accomplished.

Thus, in the color conversion section 24 of the third embodiment, from the L*a*b* color signal of the input color signal, the black amount K and the solid color amount RGB of the image output unit 13 are determined by performing the UCR processing of the achromatic component and the chromatic component. Accordingly, it is made possible to control the black amount and the solid color amount as desired with respect to the L*a*b* color signal of the input color signal considering the image quality of graininess, etc. It is made possible to determine the black amount and the solid color amount at extremely high speed as compared with the first embodiment. The remaining three-variable color signal YMC of the image output unit 13 is determined from the black amount K and the solid color amount RGB determined as described above and the input color signal L*a*b* by solving the color conversion model of the image output unit 13 using the numerical solution method so that the YMC color signal becomes calorimetrically equal to L*a*b* of device-independent color signal, so that it is made possible to ensure calorimetric color reproduction. Particularly, occurrence of a pseudo contour is a problem in the division method in the related art; in the embodiments of the invention, however, since the color conversion model of the image output unit 13 is formed without dividing the color gamut, smooth gradation representation with no occurrence of any pseudo contour is made possible.

Figure 7:
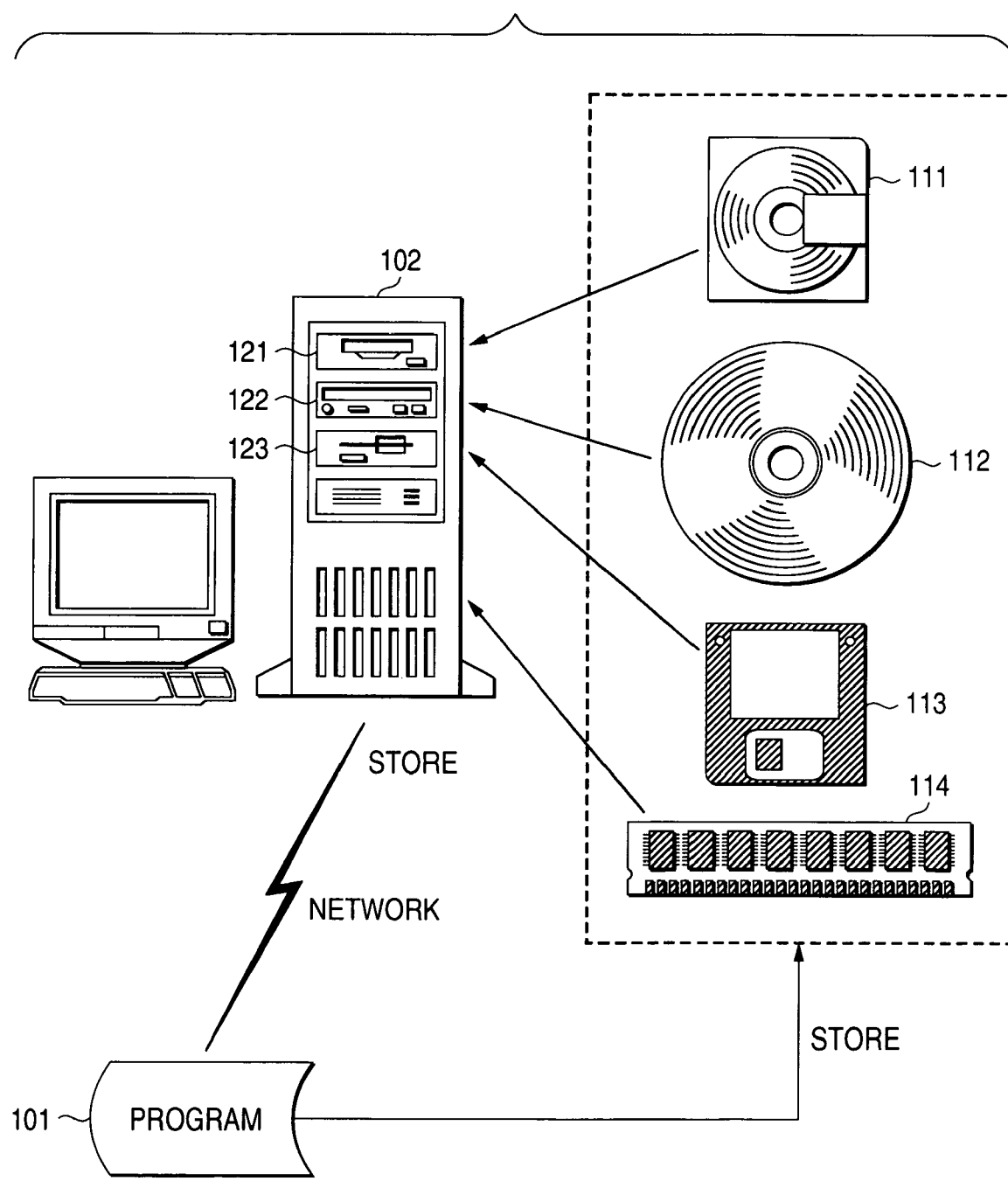
FIG. 7 is a schematic representation of an example of a computer program for realizing the function of the color image processing apparatus of the invention or the color image processing method of the invention and storage media storing the computer program.

FIG. 7 is a schematic representation of an example of a computer program for realizing the function of the color image processing apparatus of the invention or the color image processing method of the invention and storage media storing the computer program. In the figure, numeral 101 denotes a program, numeral 102 denotes a computer, numeral 111 denotes a magneto-optical disk, numeral 112 denotes an optical disk, numeral 113 denotes a magnetic disk, numeral 114 denotes memory, numeral 121 denotes a magneto-optical disk unit, numeral 122 denotes an optical disk unit, and numeral 123 denotes a magnetic disk unit.

The function of the color conversion section 24 described in the embodiments or some or all of the components of the image processing apparatus 12 other than the color conversion section 24 shown in FIG. 1 can be implemented as the program 101 that can be executed by a computer. In this case, the program 101 and the data used by the program 101 can also be stored on a storage medium that can be read by the computer. The storage medium is a medium capable of causing a change state of energy of magnetism, light, electricity, etc., to occur in a reader installed in the hardware resources of the computer in response to the program description and transmitting the program description to the reader in the corresponding signal format, such as the magneto-optical disk 111, the optical disk (including a CD, a DVD, etc.,), the magnetic disk 113, or the memory 114 (including an IC card, a memory card, etc.,). Of course, the storage media are not limited to portable media.

The program 101 is previously stored on the storage media and the storage medium is placed in the magneto-optical disk unit 121, the optical disk unit 122, or the magnetic disk unit 123 of the computer 102 or a memory slot (not show), for example, whereby the program 101 can be read from the computer 102 for executing the function of the color image processing apparatus of the invention or the color image processing method of the invention. Alternatively, a storage medium may be previously installed in the computer 102 and the program 101 may be transferred to the computer 102 through a network, etc., for example, and stored in the storage medium for execution.

Of course, some functions can also be implemented as hardware or all functions may be implemented as hardware. Alternatively, the system can be implemented as a program also containing the configuration of the original edit apparatus 11 or can also be implemented as one program together with a control program in the image output unit 13. Of course, to apply the program to any other application, the program can also be integrated into one with the program in the application.

As apparent from the description given above, according to the embodiments of the invention, the (N−3) variables of the second color signal is determined from the first color signal including three variables. the remaining three variables of the second color signal are determined on the basis of the determined (N−3) variables of the second color signal and the first color signal so that the second color signal is colorimetrically equal to the first color signal. Particularly, from the first color signal, the (N−3) variables of the second color signal such as the black amount and the solid color amount are determined from the range for making color reproduction possible in the color gamut found by solving the color conversion model of the image output unit using the numerical solution method and the achromatic UCR ratio and the chromatic UCR ratio determined from the first color signal. Accordingly, the black amount and the solid color amount can be controlled as desired with respect to the first color signal considering the image quality of graininess, etc., and full use of the color gamut of the image output unit can be made.

Further, from the (N−3) variables of the second color signal thus determined and the first color signal, for example, the color conversion model of the image output unit is determined using the numerical solution method so that the remaining three variables of the image output unit becomes calorimetrically equal to the first color signal, whereby it is made possible to ensure calorimetric color reproduction. Particularly, the division method to ensure calorimetric color reproduction in the related art involves the problem of occurrence of a pseudo contour. In the embodiments of the invention, however, since the color conversion model of the image output unit is formed without dividing the color gamut, smooth gradation representation with no occurrence of any pseudo contour is made possible.

Further, according to the embodiments of the invention, color conversion processing involving a large amount of computation can be previously performed to determine the color conversion parameter of a three-dimensional DLUT, and direct color conversion can be executed with the three-dimensional DLUT. Accordingly, it is made possible to accomplish color conversion at very high speed when actual color conversion processing is performed. If a hardware configuration is adopted for the invention, the configuration can be made simple because the computation amount is small.

Further, according to the embodiments of the invention, from the first color signal, the (N−3) variables of the second color signal is determined by performing a UCR processing of the achromatic component and the chromatic component, whereby it is made possible not only to control the black amount and the solid color amount considering the image quality, but also to determine the black amount and the solid color amount at high speed.

What is claimed is:

1. A color image processing method for converting a first color signal including three variables into a second color signal including N variables, where N is an integer, which is not smaller than five, the second color signal to be output to an image forming device which executes a print process with N colors, the color image processing method comprising:

a first conversion of determining (N−3) variables of the second color signal from the first color signal;

a second conversion of determining the remaining three variables of the second color signal on the basis of the determined (N−3) variables of the second color signal and the three variables of the first color signal so that the second color signal is colorimetrically equal to the first color signal; and outputting, as the second color signal, the determined (N−3) variables and the determined remaining three variables to the image forming device, wherein the first conversion of determining determines the (N−3) variables before the remaining three variables of the second color signal are determined, the (N−3) variables being determined on the basis of a UCR ratio of each of the (N−3) variables and a maximum value of each of the (N−3) variables, such that a color represented by a combination of the (N−3) variables is within a color gamut of the image forming device.

2. The color image processing method according to claim 1, wherein:
the second conversion includes solving a function of the second color signal, which indicates a relation between the second color signal and a device-independent color signal on color system coordinates corresponding to the second color signal, with using the first color signal and the determined (N−3) variables of the second color signal as an input.

3. The color image processing method according to claim 1, wherein:
$5 \leq N \leq 7$, and
the N variables of the second color signal include:
four variables indicating yellow, magenta, cyan, and black; and
at least one variable indicating one of red, green, and blue.

4. The color image processing method according to claim 1, wherein:
$5 \leq N \leq 7$;
the (N−3) variables of the second color signal determined in the first conversion include:
a variable indicating black; and
at least one variable indicating one of red; green, and blue; and
the three variables determined in the second conversion indicate yellow, magenta, and cyan.

5. The color image processing method according to claim 1, wherein:
the first conversion includes:
determining a UCR ratio concerning the (N−3) variables of the second color signal on the basis of the first color signal;
determining maximum and minimum values of each of the (N−3) variables of the second color signal, which are within a color gamut; on the basis of the first color signal; and
determining the (N−3) variables of the second color signal to be between the maximum and minimum values on the basis of the UCR ratio concerning the (N−3) variables of the second color signal and the maximum and minimum values.

6. The color image processing method according to claim 1, wherein:
the first conversion includes:
determining a UCR ratio concerning an achromatic component, a UCR ratio concerning a chromatic component, and three primary color signals, which represent the first color signal, on the basis of the first color signal; and
performing a UCR processing on the basis of the UCR ratio concerning the achromatic component, and the UCR ratio concerning the chromatic component to eliminate the achromatic component and the chromatic component from the three primary color signals, to thereby determine the (N−3) variables of the second color signal.

7. The color image processing method according to claim 6, wherein the three primary color signals indicate yellow, magenta, and cyan.

8. The color image processing method according to claim 1, wherein the first color signal is a L*a*b* color signal.

9. A color image processing apparatus for converting a first color signal including three variables into a second color signal including N variables, where N is an integer, which is not smaller than five, the second color signal to be output to an image forming device which executes a print process with N colors, the color image processing apparatus comprising:
a first conversion unit that determines (N−3) variables of the second color signal from the first color signal;
a second conversion unit that determines the remaining three variables of the second color signal on the basis of the determined (N−3) variables of the second color signal and the three variables of the first color signal so that the second color signal is colorimetrically equal to the first color signal; and
an output section that outputs, as the second color signal, the determined (N−3) variables and the determined remaining three variables to the image forming device,
wherein the first conversion unit determines the (N−3) variables before the remaining three variables of the second color signal are determined, the (N−3) variables being determined on the basis of a UCR ratio of each of the (N−3) variables and a maximum value of each of the (N−3) variables, such that a color represented by a combination of the (N−3) variables is within a color gamut of the image forming device.

10. The color image processing method according to claim 9, wherein: the second conversion unit solves a function of the second color signal, which indicates a relation between the second color signal and a device-independent color signal on color system coordinates corresponding to the second color-signal, using the first color signal and the determined (N−3) variables of the second color signal as an input.

11. The color image processing apparatus according to claim 9, wherein:
$5 \leq N \leq 7$, and
the N variables of the second color signal include:
four variables indicating yellow, magenta, cyan, and black; and
at least one of variable indicating one of red, green, and blue.

12. The color image processing apparatus according to claim 9, wherein:
$5 \leq N \leq 7$;
the (N−3) variables of the second color signal determined by the first conversion unit include:
a variable indicating black; and
at least one variable indicating one of red, green, and blue; and
the three variables determined by the second conversion unit indicate yellow, magenta, and cyan.

13. The color image, processing apparatus according to claim 9, wherein:
the first conversion unit:
determines a UCR ratio concerning the (N−3) variables of the second color signal on the basis of the first color signal;
determines maximum and minimum values of each of the (N−3) variables of the second color signal, which are within a color gamut, on the basis of the first color signal; and
determines the (N−3) variables of the second color signal to be between the maximum and minimum values on the basis of the UCR ratio concerning the (N−3) variables of the second color signal and the maximum and minimum values.

14. The color image processing apparatus according to claim 9, wherein:
the first conversion unit:
determines a UCR ratio concerning an achromatic component, a UCR ratio concerning a chromatic component, and three primary color signals, which represent the first color signal, on the basis of the first color signal; and performs a UCR processing on the basis of the UCR ratio concerning the achromatic component and the UCR ratio concerning the chromatic component to eliminate the achromatic component and the chromatic component from the three primary color signals, to thereby determine the (N−3) variables of the second color signal.

15. The color image processing apparatus according to claim 14, wherein the three primary color signals indicate yellow, magenta, and cyan.

16. The color image processing apparatus according to claim 9, wherein the first color signal is an L*a*b* color signal.

17. A method for producing a direct look-up table used in converting a first color signal including three variables into a second color signal including N variables, where N is an integer, which is not smaller than five, the second color signal to be output to an image forming device which executes a print process with N colors, the method comprising:

preparing a plurality of first color signals;

determining (N−3) variables of each of second color signals from the corresponding first color signal;

determining the remaining three variables of each second color signal on the basis of the determined (N−3) variables of each second color signal and the three variables of the corresponding first color signal so that each second color signal is colorimetrically equal to the corresponding first color signal;

forming the direct look-up table using corresponding pairs of the first color signals and the determined second color signals; and outputting, as each second color signal, the determined (N−3) variables and the determined remaining three variables to the image forming device, wherein the determining (N−3) variables determines the (N−3) variables before the remaining three variables of each second color signal at determined, the (N−3) variables being determined on the basis of a UCR ratio of each of the (N−3) variables and a maximum value of each of the (N−3) variables, such that a color represented by a combination of the (N−3) variables is within a color gamut of the image forming device.

18. A color image processing program causing a computer to perform a process for converting a first color signal including three variables into a second color signal including N variables, where N is an integer, which is not smaller than five, the second color signal to be output to an image forming device which executes a print process with N colors, the process comprising:

a first conversion of determining (N−3) variables of the second color signal from the first color signal;

a second conversion of determining the remaining three variables of the second color signal on the basis of the determined (N−3) variables of the second color signal and the three variables of the first color signal so that the second color signal is colorimetrically equal to the first color signals; and outputting, as the second color signal, the determined (N−3) variables and the determined remaining three variables to the image forming device, wherein the first conversion of determining determines the (N−3) variables before the remaining three variables of the second color signal are determined, the (N−3) variables being determined on the basis of a UCR ratio of each of the (N−3) variables and a maximum value of each of the (N−3) variables, such that a color represented by a combination of the (N−3) variables is within a color gamut of the image forming device.

19. A computer-readable recording medium storing a color image processing program causing a computer to perform a process for converting a first color signal including three variables into a second color signal including N variables, where N is an integer, which is not smaller than five, the second color signal to be output to an image forming device which executes a print process with N colors, the process comprising:

a first conversion of determining (N−3) variables of the second color signal from the first color signal;

a second conversion of determining the remaining three variables of the second color signal on the basis of the determined (N−3) variables of the second color signal and the three variables of the first color signal so that the second color signal is colorimetrically equal to the first color signal; and outputting, as the second color signal, the determined (N−3) variables and the determined remaining three variables to the image forming device, wherein the first conversion of determining determines the (N−3) variables before the remaining three variables of the second color signal are determined, the (N−3) variables being determined on the basis of a UCR ratio of each of the (N−3) variables and a maximum value of each of the (N−3) variables, such that a color represented by a combination of the (N−3) variables is within a color gamut of the image forming device.

* * * * *